(12) United States Patent
Tsutsui et al.

(10) Patent No.: US 6,904,076 B1
(45) Date of Patent: Jun. 7, 2005

(54) INTERFERENCE CANCELLER DEVICE AND RADIO COMMUNICATION DEVICE

(75) Inventors: Masafumi Tsutsui, Kawasaki (JP);
Yoshinori Tanaka, Kawasaki (JP);
Shuji Kobayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/260,257

(22) Filed: Mar. 2, 1999

(30) Foreign Application Priority Data

Mar. 5, 1998 (JP) .......................................... 10-053254

(51) Int. Cl.⁷ ........................ H04B 1/713; H04B 7/216; H03D 1/04; H04J 13/04
(52) U.S. Cl. ...................... 375/130; 375/148; 375/150; 375/346; 370/335
(58) Field of Search ........................ 375/130, 142–347; 370/342, 335

(56) References Cited

U.S. PATENT DOCUMENTS

| | | | | | |
|---|---|---|---|---|---|
| 5,514,612 | A | * | 5/1996 | Rao et al. .................... | 438/382 |
| 5,982,763 | A | * | 11/1999 | Sato ........................... | 370/342 |
| 6,018,528 | A | * | 1/2000 | Gitlin et al. ................ | 370/436 |
| 6,026,115 | A | * | 2/2000 | Higashi et al. ............. | 375/148 |
| 6,137,788 | A | * | 10/2000 | Sawahashi et al. ......... | 370/342 |
| 6,173,014 | B1 | * | 1/2001 | Forssen et al. ............. | 375/267 |
| 6,188,718 | B1 | * | 2/2001 | Gitlin et al. ................ | 375/148 |
| 6,205,166 | B1 | * | 3/2001 | Maruta et al. .............. | 375/130 |
| 6,301,289 | B1 | * | 10/2001 | Bejjani et al. .............. | 375/144 |
| 6,327,298 | B1 | * | 12/2001 | Grobert ...................... | 375/148 |
| 6,404,803 | B1 | * | 6/2002 | Wang et al. ................ | 375/148 |
| 6,493,379 | B1 | * | 12/2002 | Tanaka et al. ............. | 375/150 |

* cited by examiner

Primary Examiner—Stephen Chin
Assistant Examiner—Lawrence B. Williams
(74) Attorney, Agent, or Firm—Katten Muchin Zavis Rosenman

(57) ABSTRACT

The present invention is directed to an interference canceller for a DS-CDMA communication system and a radio communication device that performs multi-rate transmission and eliminates interference of high-rate channels by a simplified structure. In a DS-CDMA communication system that performs a multi-rate transmission including at least low-rate channels and high-rate channels, there is provided an interference canceller that includes an array antenna interference replicating unit. The interference replicating unit is used in high-rate channels that receive signals received via array antenna elements and creates interference replicas of the high-rate channels. The system also includes an adder 6, which subtracts the interference replicas from the received signal via the array antenna elements. Further a resultant interference-eliminated signal is applied to receivers for the low-rate and high-rate channels.

18 Claims, 14 Drawing Sheets

INTERFERENCE CANCELLER DEVICE AND RADIO COMMUNICATION DEVICE

BACKGROUND OF THE INVENTION

The present invention relates to an interference canceller using an array antenna for a Direct Sequence Code Division Multiple Access (DS-CDMA) system and a radio communication device using such an interference canceller.

In the DS-CDMA system, a multi-rate transmission system including a plurality of transmission rates is known. Since the channel capacity is affected by interference between channels, it is necessary to provide an interference canceller for eliminating the interference between channels. A structure is known in which transmission power is reduced by using an array antenna to form a beam. The use of the array antenna results in a reduction in the interference due to spatial separation, which provides an improvement in the antenna gain. A RAKE receiver system capable of coping with multi-paths is also known. It is considered that the above-mentioned various techniques may arbitrarily be combined. In this case, it enables improved characteristics with an appropriate cost.

A transmitter part in a mobile radio communication system generally includes an encoder part performing error correction and encoding, a modulator part using a given modulation system such as QPSK, and a spread demodulator part. A receiver part which corresponds to the above transmitter part generally includes a spread demodulator part sing despreading, a modulator for demodulating a modulated wave of the QPSK or the like, and a decoder part performing error correction.

FIG. 10 is a diagram showing a conventional interference canceller. As can be seen, the interference canceller has a multi-stage parallel structure including a first stage, a second stage and a final stage. In this figure, 101 indicates an antenna, 102-1, 102-2 indicate delay circuits (DL), 103-11–103-1k, 103-21–103-2k indicate interference replicating units (IRU), 104-1,104-2 indicate adders, and 105-1–105-k indicate receivers corresponding to different users. In the conventional interference canceller, it is possible to use only one stage or a number of stages.

In the first stage, a received signal is applied to the interference replicating units 103-11–103-1k corresponding to the different user channels. The units 103-11–103-1k then output symbol replicas SB and interference replicas d. The adder 104-1 subtracts the interference replicas d from the received signal obtained through the delay circuit 102-1.

A resultant signal is applied to the second stage as an error signal e.

In the second stage, the interference replicating units 103-21–103-2k units are provided with the error signal e from the first stage and the symbol replicas SB from the interference replica creating units 103-11–103-1k. The interferencing cancelling units 103-21–103-2k then output symbol replicas SB' and interference replicas d. The adder 104-2 then subtracts the interference replica d' from the error signal e supplied from the first stage via the delay circuit 102-2. A resultant signal is applied, as an error signal e' to the receivers 105-1–105-k of the final stage. The receivers 105-1–105-k which correspond to the different user channels perform a demodulation process by using the error signals e' and the symbol replica SB' from the second stage. Therefore, the received signal is obtained in each of the receivers 105-1–105-k.

FIG. 11 is a diagram showing a conventional interference replicating unit. The reference number 103 indicates the interference replicating unit shown in FIG. 10. In FIG. 11, 111 indicates despread processing parts, 112 indicates respread processing parts, 113 indicates a despreading part, 114 indicates an adder, 115 indicates a channel estimation part, 116 indicates a multiplier, 117, 119 denote combining parts (Z), 118 indicates a decision part, 120 indicates a multiplier, 121 indicates an adder, and 122 indicates a respreading part.

The despread processing parts 111 and the respread processing parts 112 are provided in a parallel form taking into account that a signal is received through a plurality of propagation routes caused by reflection or the like. Hence, the parts 111, 112 are equal in number to the paths of the propagation routes. The despread processing parts 111 are each provided with a received signal, or the error signal e and the symbol replicas SB from the previous stage (the symbol replicas SB of the first stage are zero). In each of the despread processing parts 111, the despreading part 113 despreads the received signal or the error signal e by a spreading code so that the demodulated signal can be obtained. The adder 114 then adds the symbol replica SB of the previous stage to the demodulated signal. The resultant output signal of the adder 114 is applied to the channel estimation part 115 and the multiplier 116. The channel estimation part 115 applies a channel estimation value to the multipliers 116, 120.

In this case, the received symbol is represented as $Z \cdot \xi$ where the known symbol such as a pilot signal is denoted as Z (complex number) and the propagation characteristic of the path is denoted as $\xi$ (complex number). Thus, by multiplying the received symbol $Z \cdot \xi$ by the complex conjugate of the known symbol $Z^*$, $|Z|^2 \cdot \xi$ can be obtained. As described previously, since the symbol Z is known, the propagation characteristic of the path $\xi$ is obtained. Therefore, the average value of the propagation characteristic t can be handled as a channel estimation value $\xi \hat{0}$.

The complex conjugate (indicated by symbol *) of the channel estimation value $\xi^{\wedge\wedge}$. is input to the multiplier 116, which multiplies the output signal of the adder 114 by the channel estimation value $\xi \hat{0}$. The resultant output signals of the despread processing parts 111 are summed up by the combining part 117, so that a path-diversity synthesized signal is obtained. In the path-diversity synthesized signal, the phase differences resulting from the propagation paths are already corrected.

The decision part 118 compares the synthesized output signal of the combining part 117 with a threshold value and the outputs provisionally decided data. In each of the respread processing parts 112, the multiplier 120 multiplies the decision output signal of the decision part 118 by the channel estimation value output by the corresponding channel estimation part 115 is which is output to the next stage as a symbol replica SB of the corresponding path. The adder 121 calculates the difference between the symbol replica of the present stage and the symbol replica SB of the previous stage. The difference is respread by the spreading code by the respreading part 122. The combining part 119 sums up the output signals of the respreading parts 122 corresponding to the respective paths and than outputs a resultant interference replica d, which is sent to the next stage.

The receivers 105-1–105-k of the final stage shown in FIG. 10 are configured by modifying the interference replicating unit 103 of FIG. 11 so that the respread processing parts 112 are omitted and a demodulator is provided for modulating the resulting signal. The demodulated signal is sent to a network (not shown) in which a base station is connected.

FIGS. 12A and 12B show an adaptive array receiver device. In particular, FIG. 12A shows a receiver device made up of array antenna elements 131-1–131-m and adaptive array receivers 132-1–132-k (AA receivers) corresponding to the different respective users. FIG. 12B shows the configuration for each of the adaptive array receivers 132-1 132-k. In FIG. 12B, reference number 133 indicates despread processing parts, 134-1–134-m indicate despreading part, 135-1–135-m indicate multipliers, 136 indicates a weight control part, 137, 138 indicate adders, 139 indicates a channel estimation part, 140, 141 indicate multipliers, 142 indicates a combining part (Σ), and 143 indicates a decision part.

The despreading parts 134-1–134-m in each of the despread processing parts 133 are provided to the respective array antenna elements 131-1–131-m. Each of the despreading parts 134 despread the received signal by using a spreading code supplied from a despreading code generator (not shown). The output signals of the despreading parts 134-1–134-m are respectively applied to both the multipliers 135-1–135-m and to the weight control part 136. The weight control part 136 calculates weighting factors based on the output signals of the neighboring despreading parts 134-1–134-m and the output signal of the adder 138.

The weighting factors (complex numbers) have values depending on the directions in which the radio wave comes to the array antenna elements 131-1–131-m. The multipliers 135-1–135-m multiply the weighting factors by the despread output signals. The resultant output signals of the multipliers 135-1–135-m are in phase with each other and are then applied to the adder 137. The above adding process is known as a beam forming process. The channel estimation part 139 then produces a channel estimation value similar to the despread processing parts 111 of the interference replicating unit 103 of FIG. 11. The multiplier 140 multiplies the output signal of the adder 137 (despread output signal) and the channel estimation value (complex conjugate). The resultant output signals of the despread processing parts 133 are then applied to the combining part 142.

The combined output signal from combining part 142 is input to the decision part 143, where it is compared with a threshold value for deciding data. The decision output signal from the decision part 142 is fed back to the multiplier to be multiplied by the channel estimation value so that a signal corresponding to the output signal of the adder 137 is obtained. The adder 138 calculates the difference between the output signal of the multiplier 141 and the output signal of the adder 137. The difference thus calculated is input to the weight control part 136, which produces the weighting factors having values that achieve optimal synthesizing in the adder 137.

FIG. 13 shows a conventional RAKE receiver device, in which a reference number 151 indicates an antenna and 152 indicate finger parts. Reference number 153 indicates a searcher, 154 indicates a combining part, 155 indicates a decision part, 156 indicates a despreading part, 157 indicates a multiplier, 158 indicates a spreading code output part, 159 indicates a dump filter, 160 indicates a delay adjustment part (τ), 161 indicates a channel estimation part, 162 indicates a multiplier, 163 indicates matching filter, 164 indicates an averaging part, 165 indicates a memory (RAM) for storing a delay profile, and 166 indicates a path detection part which performs a finger allocation.

The RAKE receiver device allocates the finger parts 152 to the different paths in accordance with the delay profile obtained by the searcher 153. The averaging part 164 of the searcher 153 averages the output signal from the matching filter 163. The delay profile thus obtained is stored in the memory 165. The path detection part 166 performs a path decision using the delay profile. For example, if a delay profile P shown in FIG. 14 is obtained, the path detection part 166 compares the receive level with a threshold value TH1 and detects paths P1, P2 and P3 that exceed the threshold value TH1. The path detection part 166 then allocates the paths P1, P2 and P3 to the first, second and third finger parts 152, respectively.

The above allocation is attained by adjusting the delay times of the finger parts 152 in accordance with the phase differences among the paths P1, P2 and P3. Then a start signals is applied to the spreading code output part 158 at the timings corresponding to the paths P1, P2 and P3. Hence, the despreading process for the received signals is started. Therefore, the received signals obtained through the paths P1, P2 and P3 are synthesized so that the receive sensitivity is improved.

As has been described previously, the radio communication device of the DS-CDMA system is equipped with the interference canceller for eliminating interference from another channel, and thus improves the receive characteristics. Further, the radio communication device of the DS-CDMA system uses the array antenna and the adaptive array receiver that synthesizes the received signals on the basis of the directions in which the radio waves arrive at the array antenna elements.

However, a mere application of the array antenna to the DS-CDMA system to form the adaptive array receiver device makes the structure very complex and thus increases the cost of the system. Particularly, the complex structure also results from the unique arrangement of the DS-CDMA system in which radio communications are performed in a state in which high-rate channels of high transmission rates and low-rate channels of low transmission rates are mixed.

SUMMARY OF THE INVENTION

An object of the present invention is to simplify the structure of the interference canceller in order to reduce the cost of a radio communication device.

These and other objects are met according to the present invention by an interference canceller multi-rate transmission including at least low-rate channels and high-rate channels. The interference canceller includes an array antenna interference replicating unit for use in the high-rate channels. The array antenna replicating units receive signals corresponding to array antenna elements and creates interference replicas of the high-rate channels. An adder that subtracts the interference replicas generated by the array antenna interference replicating units from the received signals, and then outputs an interference-eliminated signal from which high-rate channel interference has been eliminated. Thus, interference of the high-rate channels having high transmission power is eliminated and the transmission quality of the low-rate channels is prevented from being degraded without requiring interference replicating unit for the low-rate channels.

The interference canceller according to the present invention also may be configured to include a searcher that detects paths based on a delay profile of the received signals and allocates finger parts to the paths that have been detected. The searcher includes a memory that stores a threshold value for detecting paths of the low-rate channels, a path detection unit that detect paths of the high-rate channels by using the threshold value stored in the memory and allocates the finger parts to the paths detected.

A radio communication device according to the present invention for a DS-CDMA communication system includes an interference canceller that receives signals via array antenna elements and receivers that receive interference-eliminated signals from the interference canceller and performs demodulation. The interference canceller includes array antenna interference replicating units for high-rate channels, and adders that subtract interference replicas from the array antenna interference replicating units from the signals received via the array antenna elements this enables resultant interference-eliminated signals to be applied to the receivers, wherein the receivers receiving the interference-eliminated signals perform demodulation.

The radio communication device according to the present invention is configured so that it further includes a searcher that detects paths based on a delay profile of one of the received signals obtained via at least one of the array antenna elements. The searcher allocates the finger parts to the paths detected. The searcher also includes a memory that stores a threshold value for detecting paths of the low-rate channels, a path detection unit that detects paths of the high-rate channels by using the threshold value stored in the memory and then allocates the finger parts to the paths detected.

The radio communication device according to the present invention also is configured so that the interference canceller includes an array antenna interference replicating units for the high-rate channels that receive the signals received via the array antenna elements. Adders also are included that subtract the interference replicas from the array antenna interference replicating units from the signals received via the array. Further, receivers have a structure that performs demodulation by beam forming using the interference-eliminated signals corresponding to the array antenna elements.

The radio communication device according to the present invention also is configured so that the interference canceller includes array antenna interference replicating units that create interference replicas of the high-rate channels and symbol replicas from the signals received via the array antenna elements. Further, adders are included to subtract the interference replicas from the array antenna interference replicating units from the signals received via the array antenna elements so that interference-eliminated signals are output. The receivers for the low-rate channels have a structure that performs demodulation by beam forming using the interference-eliminated signals corresponding to the array antenna elements. The receivers for the high-rate channels have a structure that performs demodulation by using the interference-eliminated signals corresponding to the array antenna elements and the symbol replicas.

The radio communication device according to the present invention also is configured so that the interference canceller includes an array antenna interference replicating unit for the high-rate channels that receive the signals received via the array antenna elements and interference replicas. Further, an adder subtracts the interference replicas from one of the signals received via the array antenna elements and applies a resultant interference-eliminated signal to the receivers for the low-rate channels.

The radio communication device according to the present invention also is configured so that the interference canceller includes array antenna interference replicating units for the high-rate channels that receive the signals received via the array antenna elements and creates interference replicas and symbol replicas. Further, an adder is included to subtract the interference replicas from the array antenna interference replicating units from one of the signals received via the array antenna elements. The receivers for the low-rate channels perform demodulation using the interference-eliminated signals. The receivers for the high-rate channels perform demodulation using the interference-eliminated signals and the symbol replicas.

DETAILED DESCRIPTION

Figure 1:
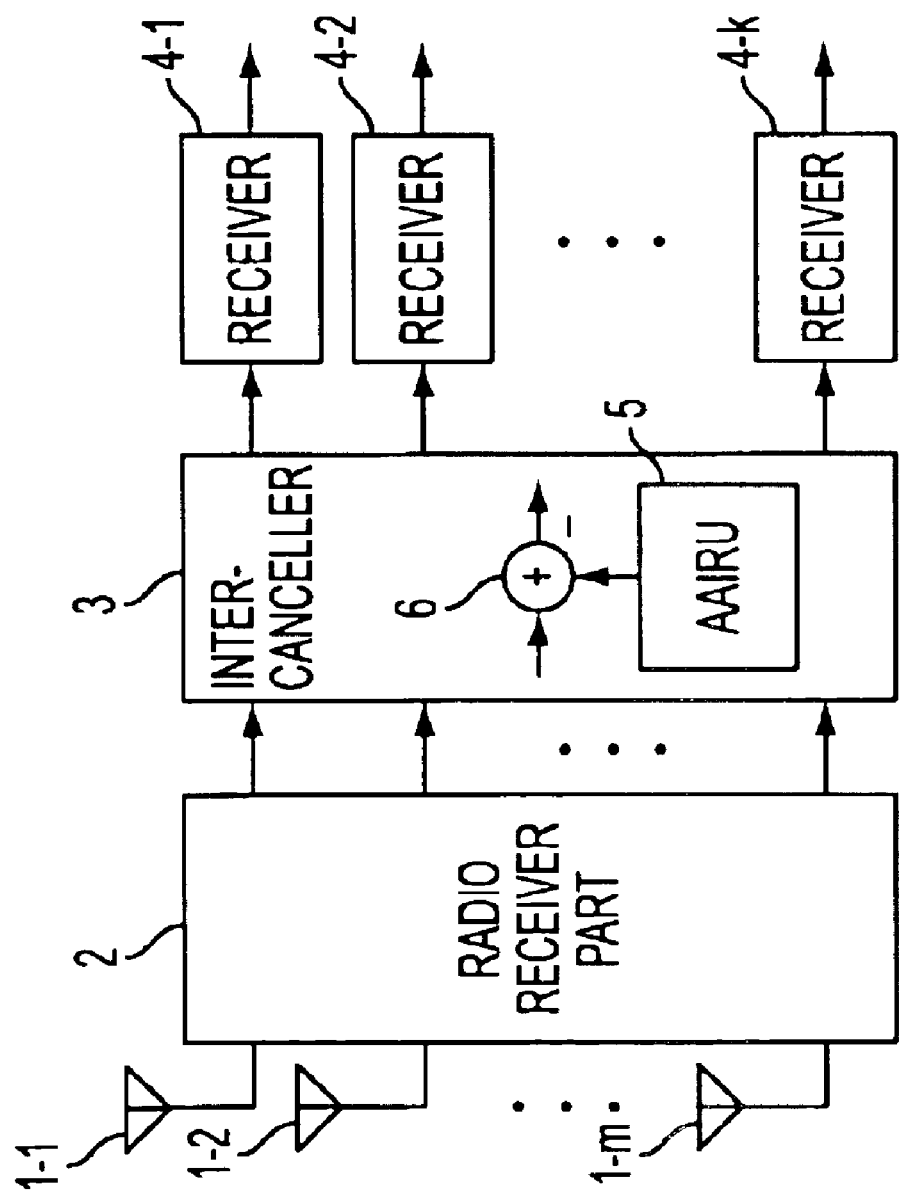
FIG. 1 is a block diagram of a radio communication device according to the present invention.

FIG. 1 shows a radio communication device according to an embodiment of the present invention. In this figure, reference numbers 1-1–1-m indicate antenna array elements, 2 indicates a radio receiver part, 3 indicates an interference canceller, 4-1–4-k indicate receivers corresponding to the different users, 5 indicates an array antenna interference replicating unit (AAIRU) for high-rate channels, and 6 indicates an adder that subtracts an interference replica from the received signals. The structure of FIG. 1 corresponds to a receiver part of a base station in which communications are performed in the DS-CDMA system with low-rate channels and high-rate channels mixed. The receiver includes the components involved with the low-rate channels and the high-rate channels, and is connected to the network, an illustration of which is omitted.

The radio receiver part 2 includes, for each of the array antenna elements 1-1–1-m, a low-noise amplifier, a band-pass filter, a frequency converter, a local oscillator, and an A/D converter. The radio receiver part 2 converts signals received via the array antenna elements 1-1–1-m into digital signals, which are applied to the interference canceller 3. The interference canceller 3 includes an array antenna interference replicating unit 5 for use in a high-rate channel, which eliminates an interference replica of the high-rate channel from the signal with the high-rate and low-rate channels mixed.

The transmission power for the high-rate channel is comparatively large which introduces large interference in the low-rate channels. In the present invention, the high-rate-channel-based interference in the received signals for the low-rate channel users is removed by removing the interference in the high-rate channels using the interference replicas created by the interference replicating unit 5. This makes it possible to improve the receiving characteristics of the low-rate channels without providing an interference replicating unit for the low-rate channels.

Figure 2:
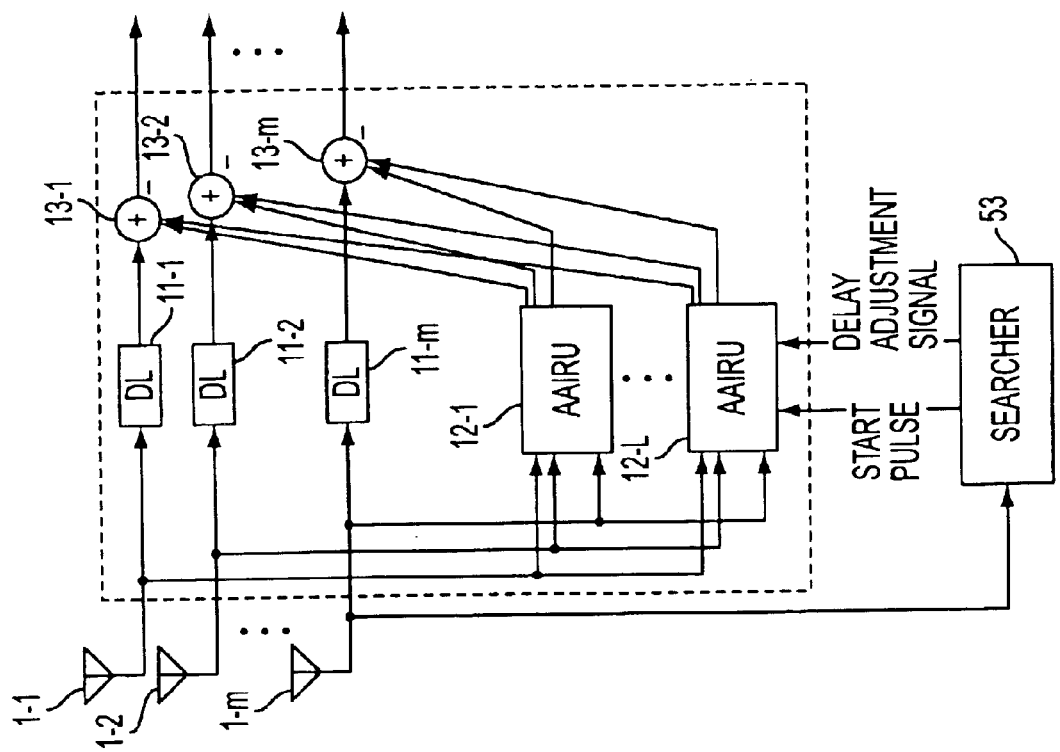
FIG. 2 is a block diagram of an interference canceller according to the present invention.

FIG. 2 shows an interference canceller according to the present invention. In this figure, 1-1–1-m indicate array antenna elements, 11-1–11-m indicate delay circuits (DL), 12-1–12-L indicate array antenna interference replicating units (AAIRU), and 13-1–13-m indicate adders. An illustration of the radio receiver part is omitted for the sake of simplicity.

The signals received via the array antenna elements 1-1–1-m are input to the array antenna interference replicating units 12-1–12-L which create interference replicas of the high-rate channels. The adders 13-1–13-m subtract the interference replicas of the high-rate channels from the received signals supplied via the delay circuits 11-1–1-m. The resultant output signals of the adders 13-1–13-m are applied to the user receivers (not shown) of the low-rate channels. Although, the structure shown in FIG. 2 has a single stage, a multistage structure including a second stage can also be employed. A searcher 53 may also be included, which will be described in detail later.

Figure 3:
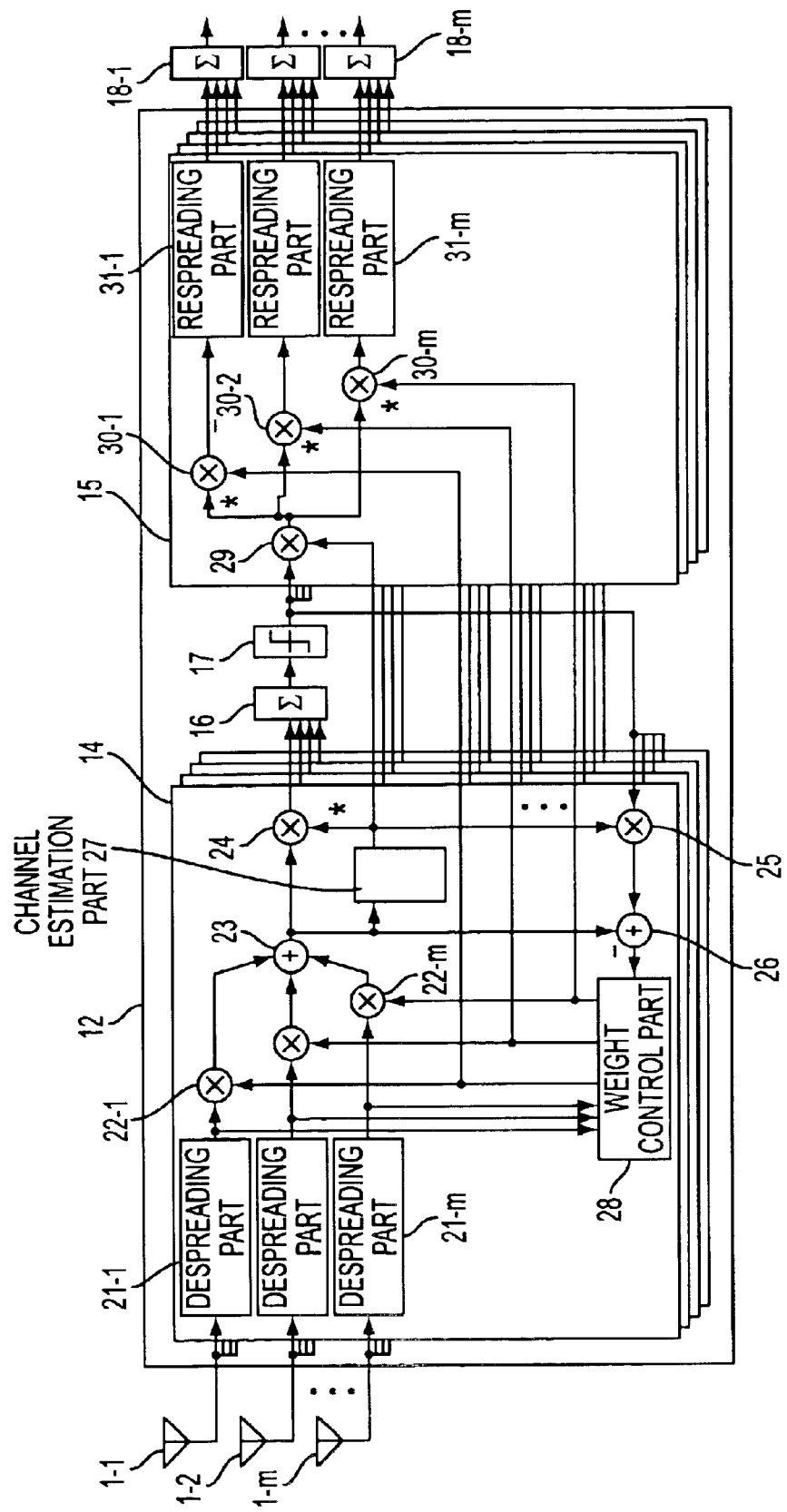
FIG. 3 is a block diagram showing of an embodiment of an interference replicating unit according to the present invention.

FIG. 3 shows an embodiment of an interference replicating unit according to the present invention. In this figure, reference number 12 indicates the array antenna interference replicating unit for the high-rate channels. Reference number 14 indicates despread processing parts, 15 indicate respread processing parts, 16 and 18-1–18-m indicate combining parts (Σ), 17 indicates a decision part, 21-1–21-m indicate respreading parts, 22-1–22-m indicate multipliers, 23 indicates an adder, 24 indicate multipliers, 26 indicates an adder, 27 indicates a channel estimation part, 28 indicates a weight control part, 29 indicates a multiplier, 30-1–30-m indicate multipliers, and 31-1–31-m indicate respreading parts.

The despread processing parts 14 all have the same structure in order to process multipaths. Similarly, the respread processing parts 15 have the same structures as each other also to process the multipaths. The despread processing parts 14 have the despreading parts 21-1–21-m respectively corresponding to different array antenna elements. The despread output signals of the despreading parts 21-1–21-m are respectively applied to the multipliers 22-1–22-m and the weight control part 28. The weight control part 28 is supplied with the difference between the output signal of the adder 23 and the output signal of the multiplier 25. The above difference is output by the adder 26.

The weight control part 28 calculates weight factors on the basis of the output signals of the neighboring despreading parts 21-1–21-m and the difference output by the adder 26. The weight factors calculated are than input to the multipliers 22-1–22-m, 30-1–30-m The despread output signals are multiplied by the weight factors by the multipliers 22-1–22-m. The despread output signals which are brought in phase in the above manner are added by the adder 23. The output signal of the adder 23 is applied to the multiplier 23, channel estimation part 27 and the adder 26.

As has been described previously, the channel estimation part 27 obtains a channel estimation part using a known symbol. The complex conjugate (denoted by *) of the estimation value is input to the multiplier 24, which receives the output signal of the adder 23. Thus, the output signals of the despread processing parts 14 are brought in phase and are applied to the combining part 16. The decision part 17 provisionally makes a decision on the output signal of the combining part 16. The output signal of the decision part 17 is applied to the multiplier 25 of the despread processing parts 14 and the multiplier 29 of the respread processing parts 15. Only the known symbol used when the channel estimation value is calculated may be used as the input to the multipliers 25.

In each of the respread processing parts 15, the multiplier 29 multiplies the provisionally decided data by the channel estimation value so that the original state is obtained. The multipliers 30-1–30-m multiply the output signal of the multiplier 29 by the complex conjugate (*) of the weight factors so that the states of the spread output signals of the despreading parts 21-1–21-m are obtained. The respreading parts 31-1–31-m perform the respreading operations on the output signals of the multipliers 30-1–30-m. The combining parts 18-1–18-m then combine the respread output signals corresponding to the different paths, so that interference replicas are produced. The output signals of the multipliers 29 are used as symbol replicas after the array antenna combining. Further, the output signals of the multipliers 30-1–30-m are handled as replicas of the antenna elements.

Figure 4:
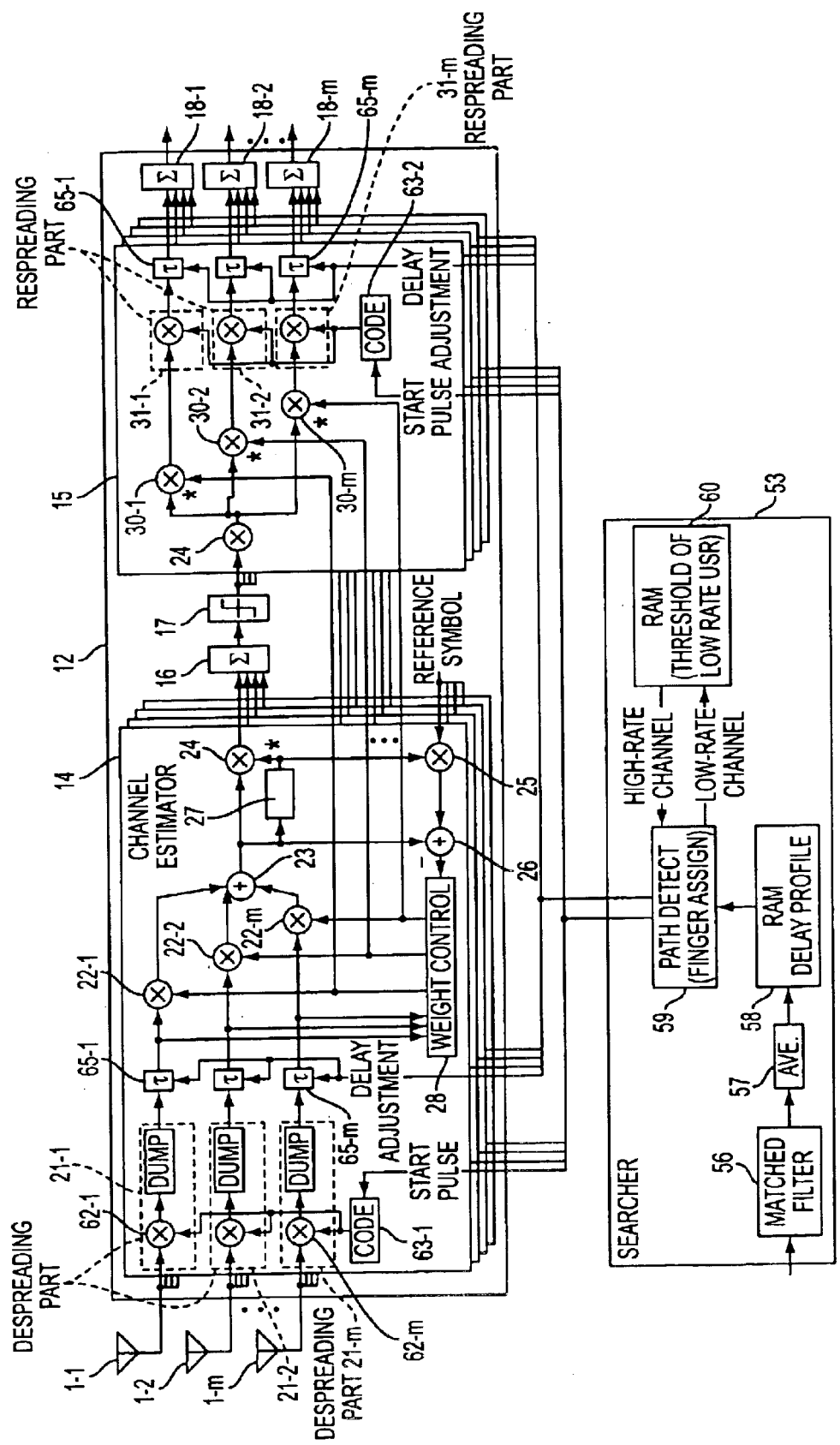
FIG. 4 is a block diagram of another interference replicating unit with a searcher according to the present invention.
Figure 12:
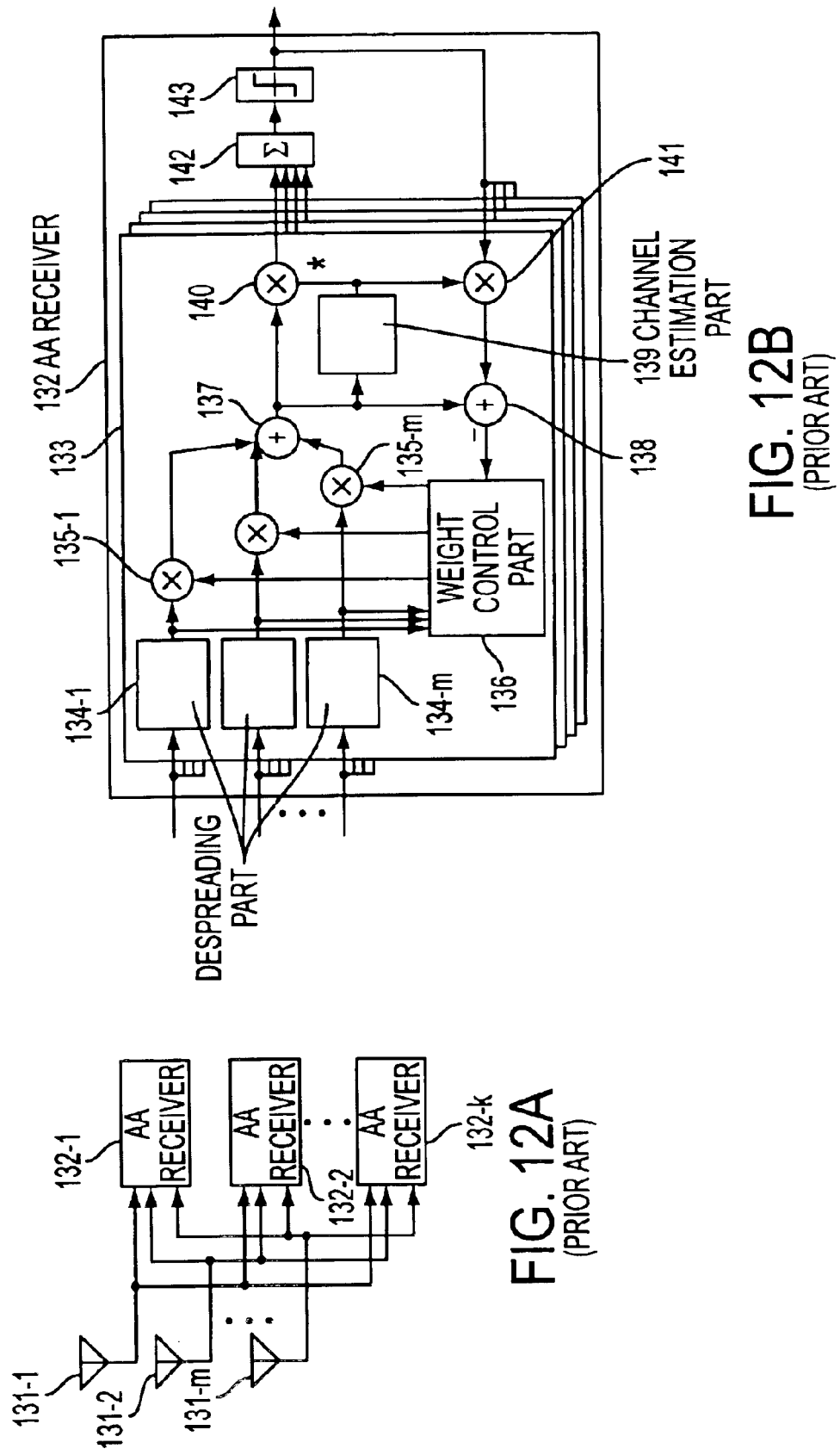
FIG. 12 is a block diagram of a conventional adaptive array device.
Figure 13:
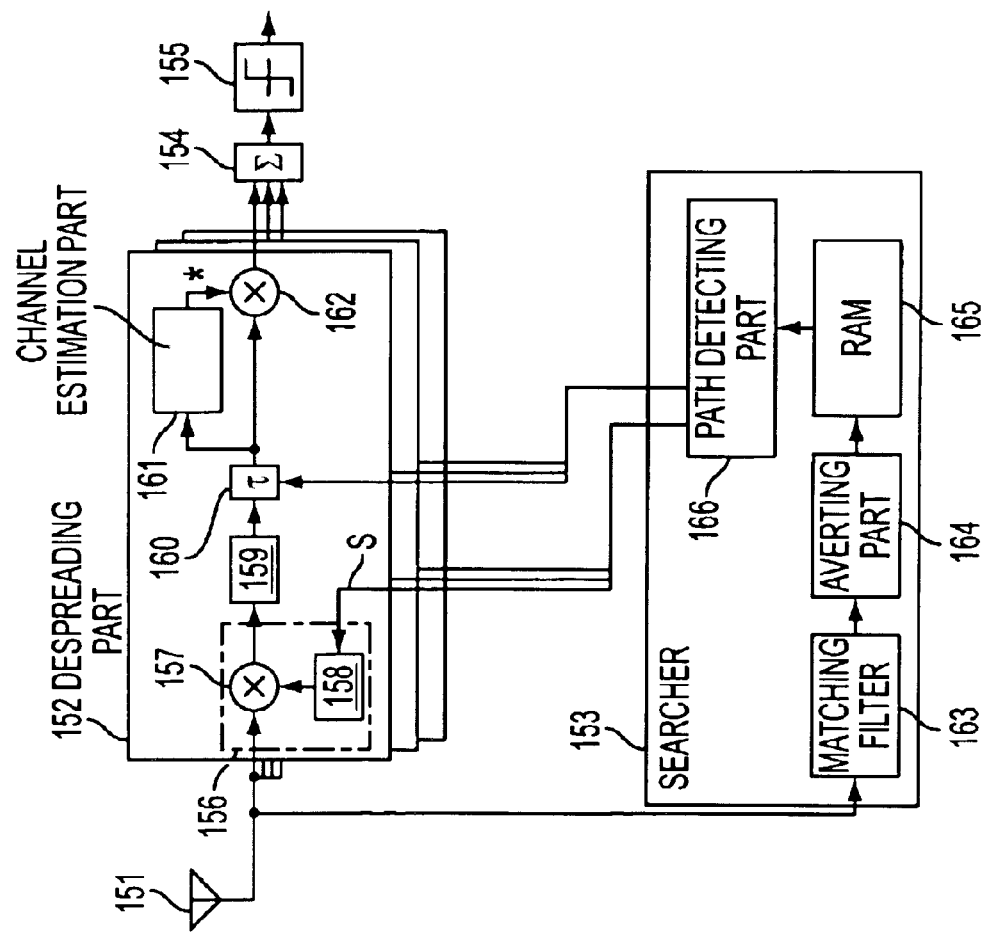
FIG. 13 is a block diagram of a conventional RAKE receiver device.

The structure obtained by omitting the aforementioned respread processing parts is equivalent to the adaptive array receiver device shown in FIG. 12. In the present invention, the array antenna interference replicating unit 12 for the high-rate channels is configured to include the respread processing parts 15. Hence, it is possible to eliminate the high-rate-channel-based interference in the low-rate channels and ensure the transmission qualities of the low-rate channels with a less-expensive structure FIG. 4 shows another interference replicating unit with a searcher according to the present invention. Reference numbers 1-1–1-m indicate antenna elements, 14 indicate despread processing parts, 53 indicates a searcher, 16 indicates a combining part, 17 indicates a decision part, 56 indicates a matched filter, 57 indicates an averaging part, 58 indicates a memory (RAM) storing a delay profile, 59 indicates a path detection part, 60 indicates a memory (RAM) storing a threshold value for path detection for low-rate channels, 21-1 to 21-m indicate despreading parts, 31-1 to 31-m indicate respreading parts, 62-1 to 62-m indicate multipliers, 63-1, 63-2 indicate spreading code generators, 64-1 to 64-m indicate dump filters, 65-1 to 65-m indicates delay adjustment parts (X), 27 indicates a channel estimator, and 24 indicates a multiplier. The antenna elements 1—1 to 1-m receive signals which are input to the searcher 53.

The searcher 53 is made up of the matched filter 56, the averaging part 57, the memory 58 for storing the delay profile, the path detection part 59 and the memory 60 for storing the threshold value for the paths of the low-rate-channels. The searcher 53 is used to allocate the despread processing parts 14 and the respread processing parts 15 to the paths.

Figure 5B:
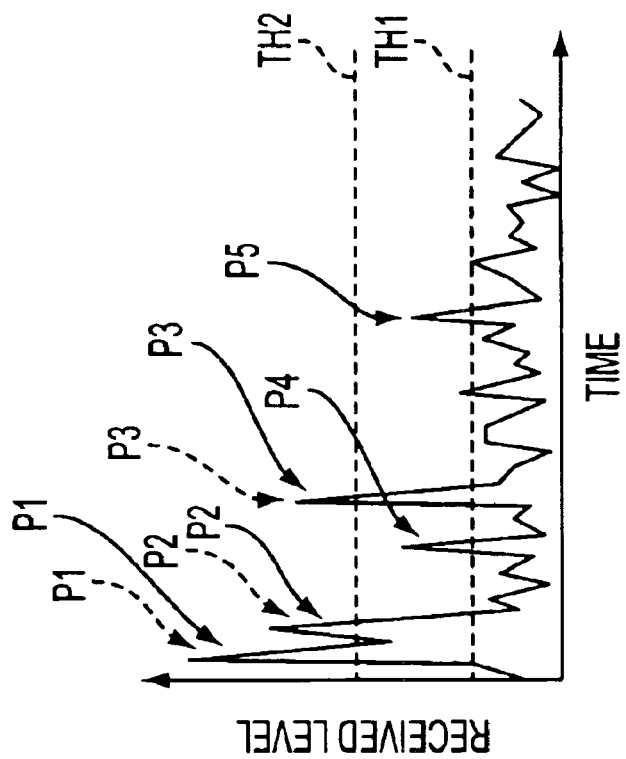
FIG. 5 is a graph illustrating a path detection for high-rate channels according to the present invention.
Figure 5A:
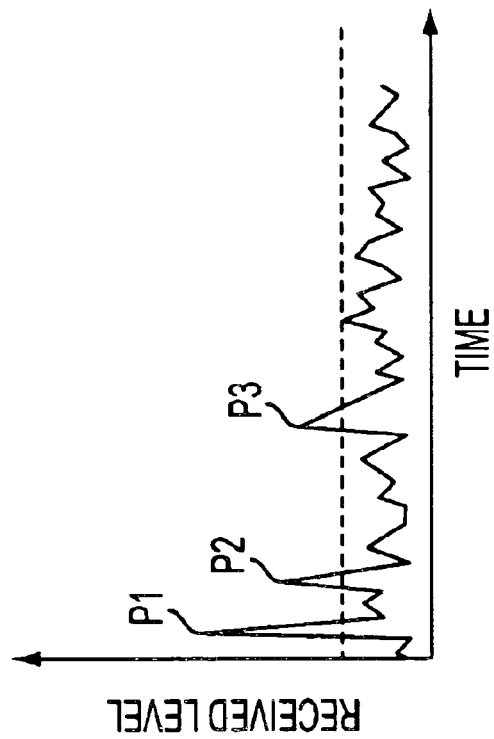
Figure 14:
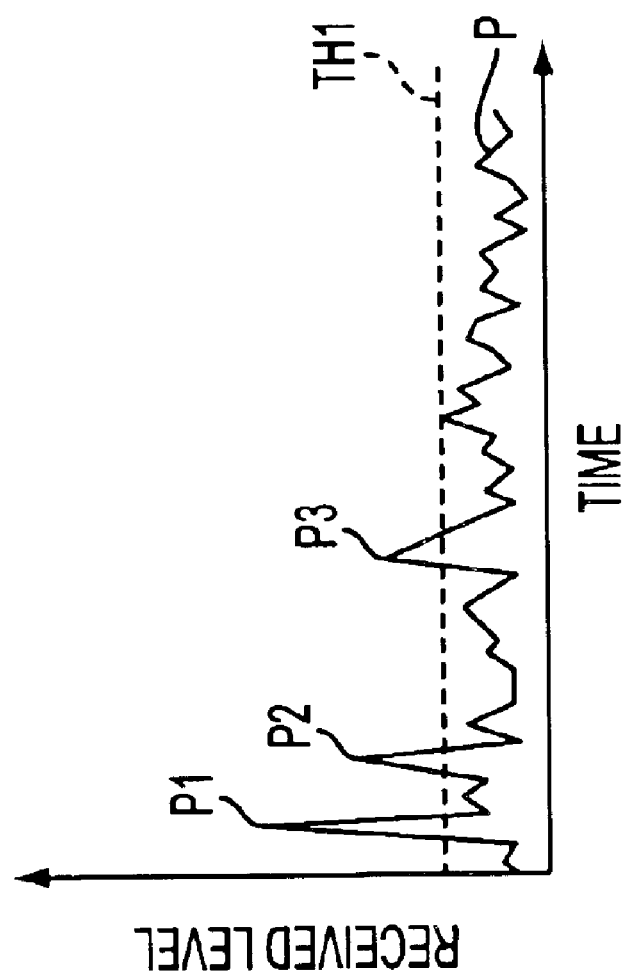
FIG. 14 is a graph illustrating a conventional finger allocation process.

FIGS. 5A and 5B shows the path detection for the high-rate channels. In particular, FIG. 5A shows a delay profile for low-rate channels, while FIG. 5B shows a delay profile for high-rate channels. In the delay profile of the low-rate channels shown in FIG. 5A, as in the case previously described with reference to FIG. 14, the path detection part 59 sets for the low-rate channels, a threshold value TH1 based on the delay profile stored n the memory 58 and the averaged received signal output by the averaging part 57. The path detection part 59 then allocates paths P1, n and P3 having levels exceeding the threshold value TH1 to the finger parts. In the delay profile for the high-rate channels shown in FIG. 5(B), the prior art path detection part 59 sets a threshold value TH2 on the basis of the above delay profile, and allocates the paths P1, P2 and P3 having levels exceeding the threshold value TH2 to the finger parts.

However, in the high-rate channels, there is a possibility that received levels may not exceed the threshold value TH2, but may exceed the threshold value TH1 for the low-rate channels. If the number of paths is larger than the number of despread processing parts 14, the interference may not effectively be eliminated. In view of the above problem, according to the present invention the threshold value TH1 for detecting paths of the low-rate channels is stored in the memory 60. The stored threshold value TH1 is read therefrom at the time of detecting paths of the high-rate channels by the path detection part 53. The threshold value TH1 read from the memory 60 is then used as the threshold value for detecting paths of the high-rate channels.

Hence, at the time of detecting paths of the high-rate channels, the path detection part 59 detects paths having levels exceeding the threshold value TH1 for detecting paths of the low-rate channels. Thus, in the case shown in FIG. 5(B), paths P1–P5 are detected. The parts 14 are allocated to the detected paths P1–P5. As described above, an increased number of despread processing parts 14 is employed in order to detect an increased number of paths at the time of detecting paths of the high-rate channels.

Hence, it is possible to effectively control interference in the high-rate channels in which high transmission power is used. Referring back to FIG. 4, the searcher 53 is applied to the path-based allocation in the despreading processing parts 14 in the interference replicating unit 12. Thus, it is possible to produce the interference replicas of the high-rate channels. That is, instead of omitting the interference replicating unit for the low-rate channels, the interference replicas for the highly-precise, high-rate channels can be produced from the interference replicating unit for the high-rate channels.

Figure 6:
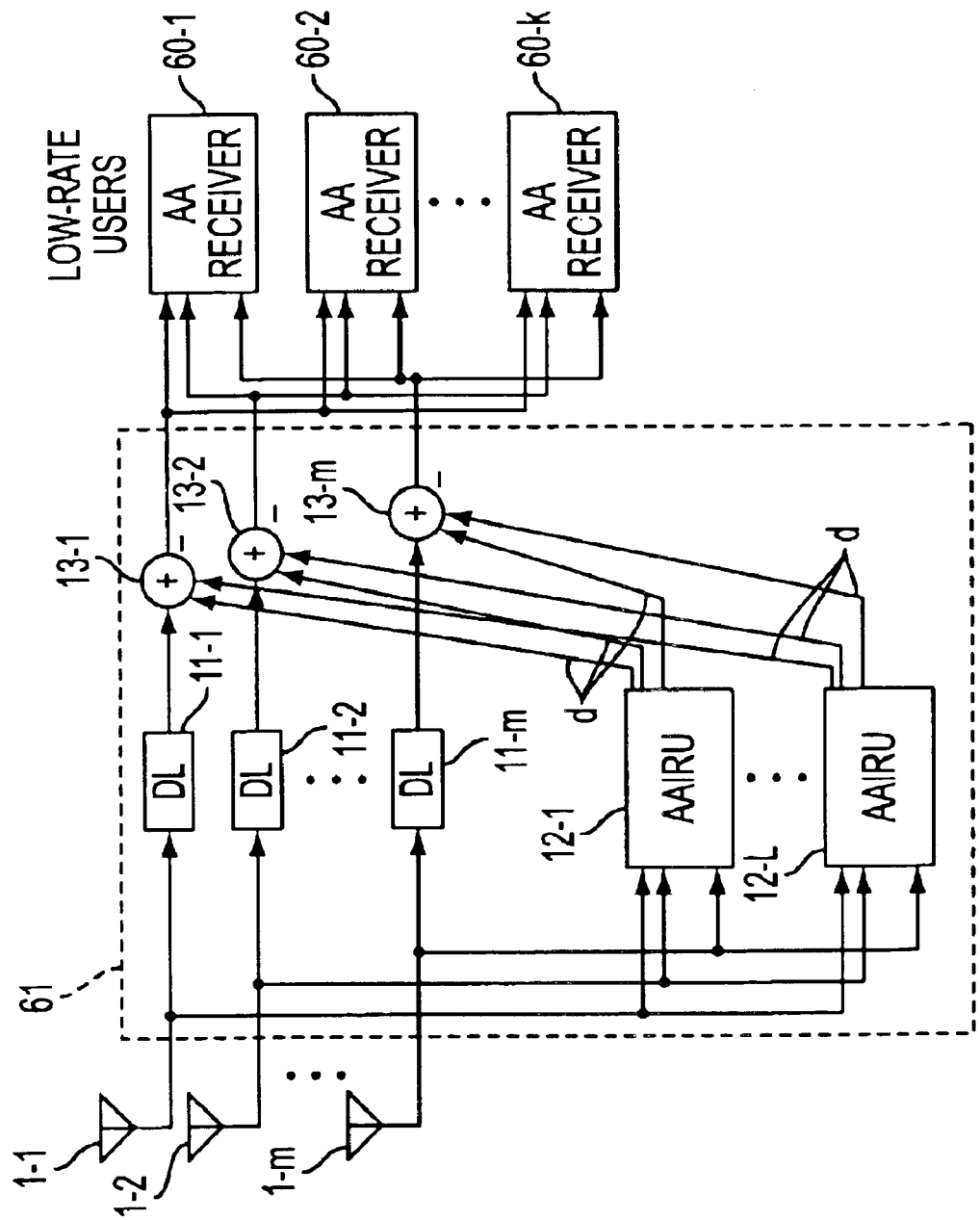
FIG. 6 is a block diagram of a radio communication device according to a first embodiment of the present invention.

FIG. 6 shows a radio communication according to a first embodiment of the present invention. The structure shown in FIG. 6 corresponds to a receiver part of the base station in the DS-CDMA system, wherein the structure shown in FIG. 2 is applied to the receiver part. In FIG. 6, reference numbers 1-1–1-m indicate array antenna elements, 11-1–11-m indicate delay circuits (DL), 12-1–12-L array antenna interference replicating units (AAIRU) for the high-rate channels, 13-1–13-m indicate adders, 60-1–60-k indicate adaptive array receivers (AA receivers) for low-rate users, and 61 indicates an interference canceller.

The array antenna interference replicating units 12-1–12-L have the structure shown in FIG. 3, and create interference replicas of the high-rate channels. The adders 13-1–13-m subtract the interference replicas d from the received signals obtained via the delay circuits 11-1–11-m. As have been described previously, the delay circuits 11-1–11-m compensate for delays in time caused by the processes of the array antenna interference replicating units 12-1–12-L.

The adaptive array receivers 60-1–60-k may have a structure, for example, as shown in FIG. 12. That is, demodulation can be performed based on the received signal obtained by the combining after the beam forming. Although the receivers for the high-rate users are not shown for the sake of simplicity, it is possible to use the decision outputs of the decision parts 17 (see FIG. 3) in the array antenna interference replicating units 12-1–12-L. The symbol replica cannot be used because the channel estimation value is multiplied and the symbol replica is obtained before being phase corrected. Although, FIG. 6 shows only one stage, a multistage structure may be used.

Figure 7:
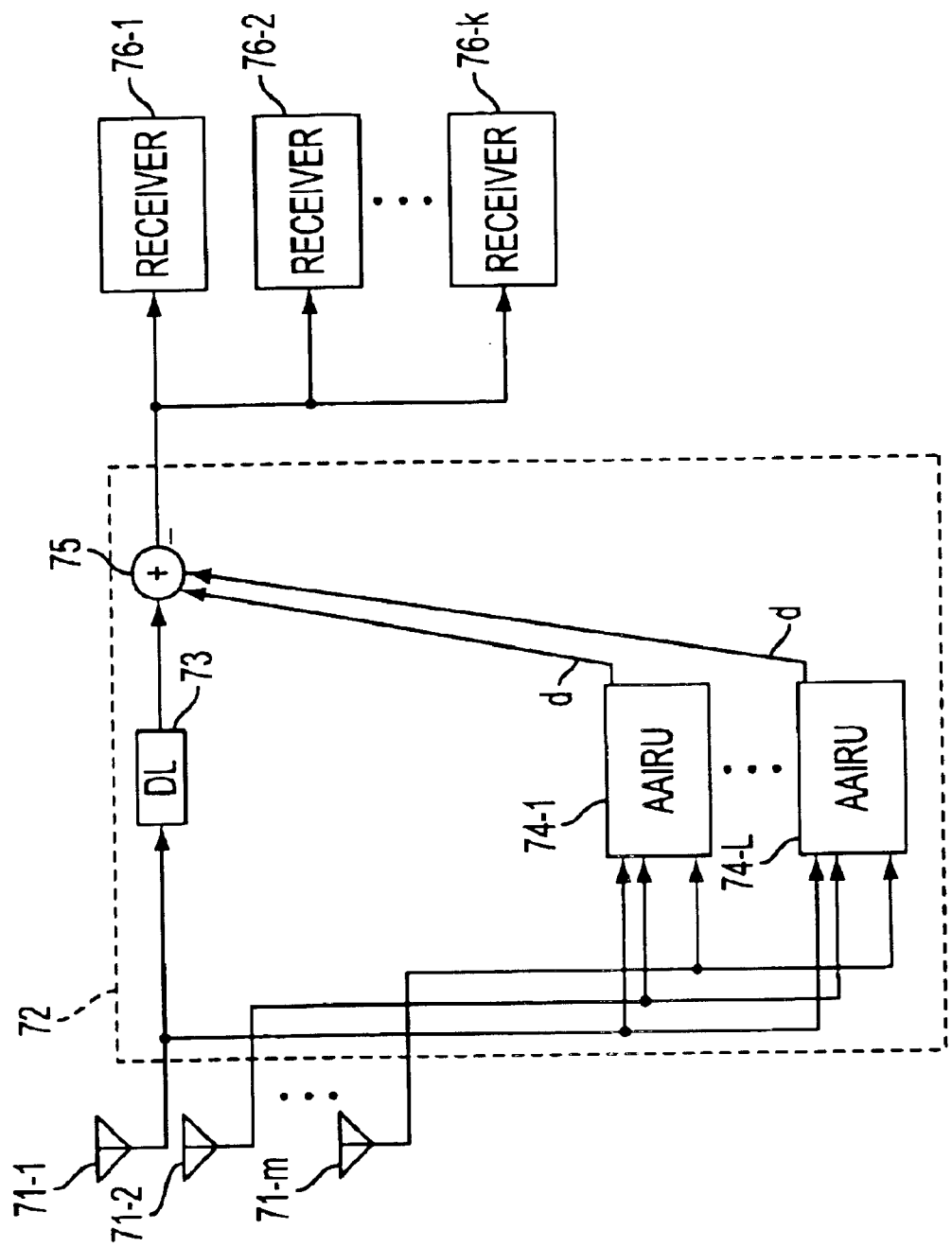
FIG. 7 is a block diagram of a radio communication device according to a second embodiment of the present invention.

FIG. 7 shows a radio communication device according to a second embodiment of the present invention. The structure shown in FIG. 7 is simpler than that shown in FIG. 6. In FIG. 7, reference numbers 71-1–71-m indicate array antenna elements, 72 indicates an interference canceller, 73 indicates a delay circuit (DL), 74-1–74-L indicate array antenna interference replicating units ((AAIRU), 75 indicates an adder, and 76-1–76-k indicate receivers of low-rate users.

The signals received via the array antenna elements 71-1–71-m are input to the array antenna interference replicating units 74-1–74-L. The signal received via the array antenna element 71-1 is input to the receivers 76-1–76-k, via the delay circuit 73 and the adder 75. The adder 75 subtracts the interference replicating d from the array antenna interference replicating units 74-1–74-L from the signal obtained via the delay circuit 73, so that interference of the high-rate channels having high transmission power are eliminated. The interference-eliminated signal is then input to the low-rate user receivers 76-1–76-k, which perform the demodulation process. Even in this case, it is possible to use the decision outputs of the decision parts in the array antenna interference replicating units 74-1–74-L.

Figure 8:
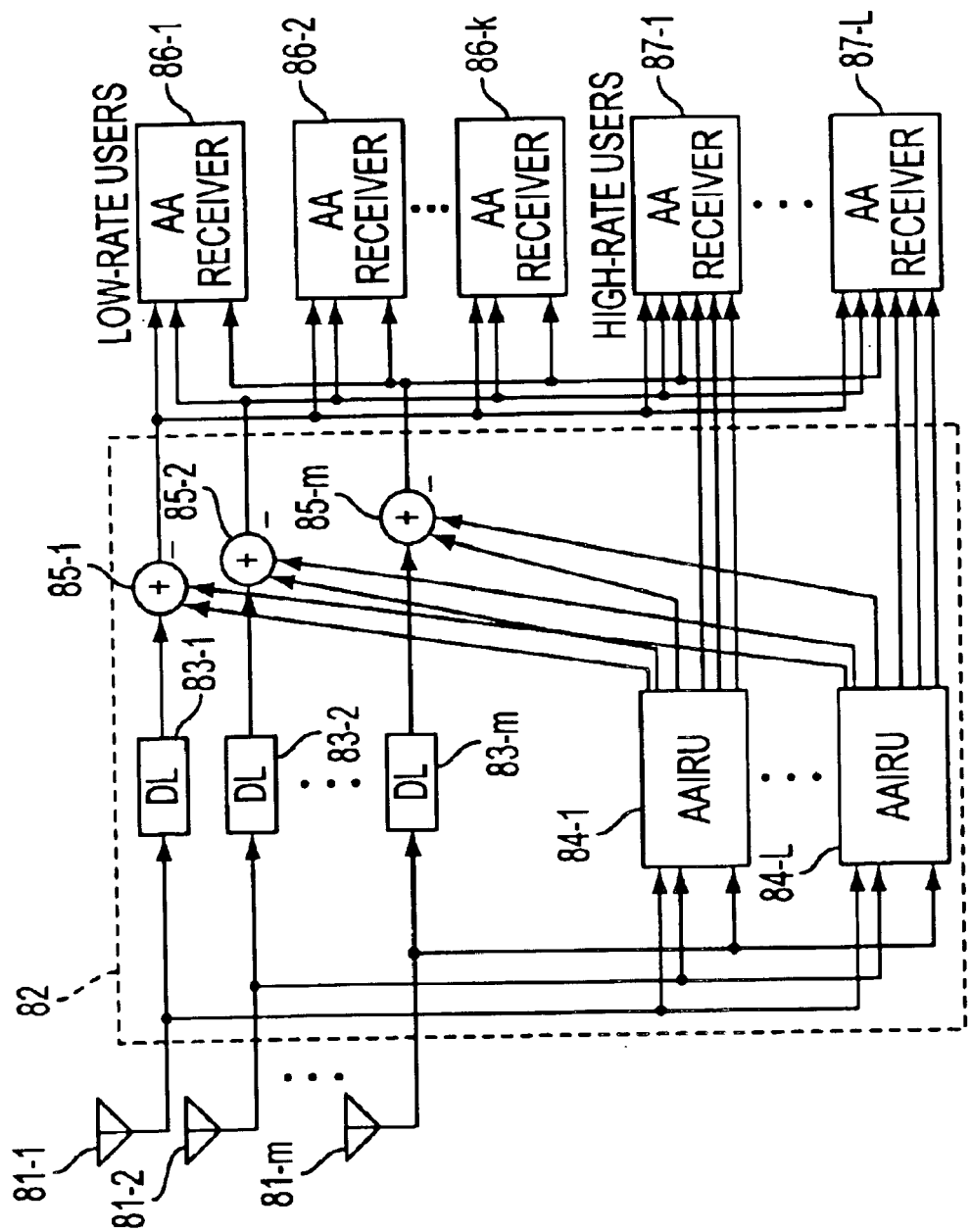
FIG. 8 is a block diagram of a radio communication device according to a third embodiment of the present invention.

FIG. 8 shows a radio communication device according to a third embodiment of the present invention. In this figure, reference numbers 81-1–81-m indicate array antenna elements, 82 indicates an interference canceller, 83-1–83-m indicate delay circuits (DL), 84-1–84-L indicate array antenna interference replicating units (AAIRU), 85-1–85-m indicate adders, 86-1–86-k indicate adaptive array receivers (AA receivers) for low rate users, and 87-1–87-L indicate adaptive array receivers (AA receivers) for high-rate users.

The array antenna interference replicating units 84-1–84-L have a structure similar to that of the array antenna interference replicating units in the aforementioned embodiments of the present invention. Signals received via the array antenna elements 81-1–81-m are applied to the array antenna interference replicating units 84-1–84-L. Hence, interference replicas of the high-rate channels and symbol replicas are created. The interference replicas thus created are respectively applied to the adders 85-1–85-m, which subtract the received replicas from the received signals obtained via the array antenna elements 81-1–82-m. Interference-eliminated signals which do not have interference of the high-rate channels are then input to the adaptive array receivers 86-1–86-k of the low-rate users and the adaptive array receivers 87-1–87-L of the high-rate users. These receivers may have a structure as shown in FIG. 12, for example.

Figure 11:
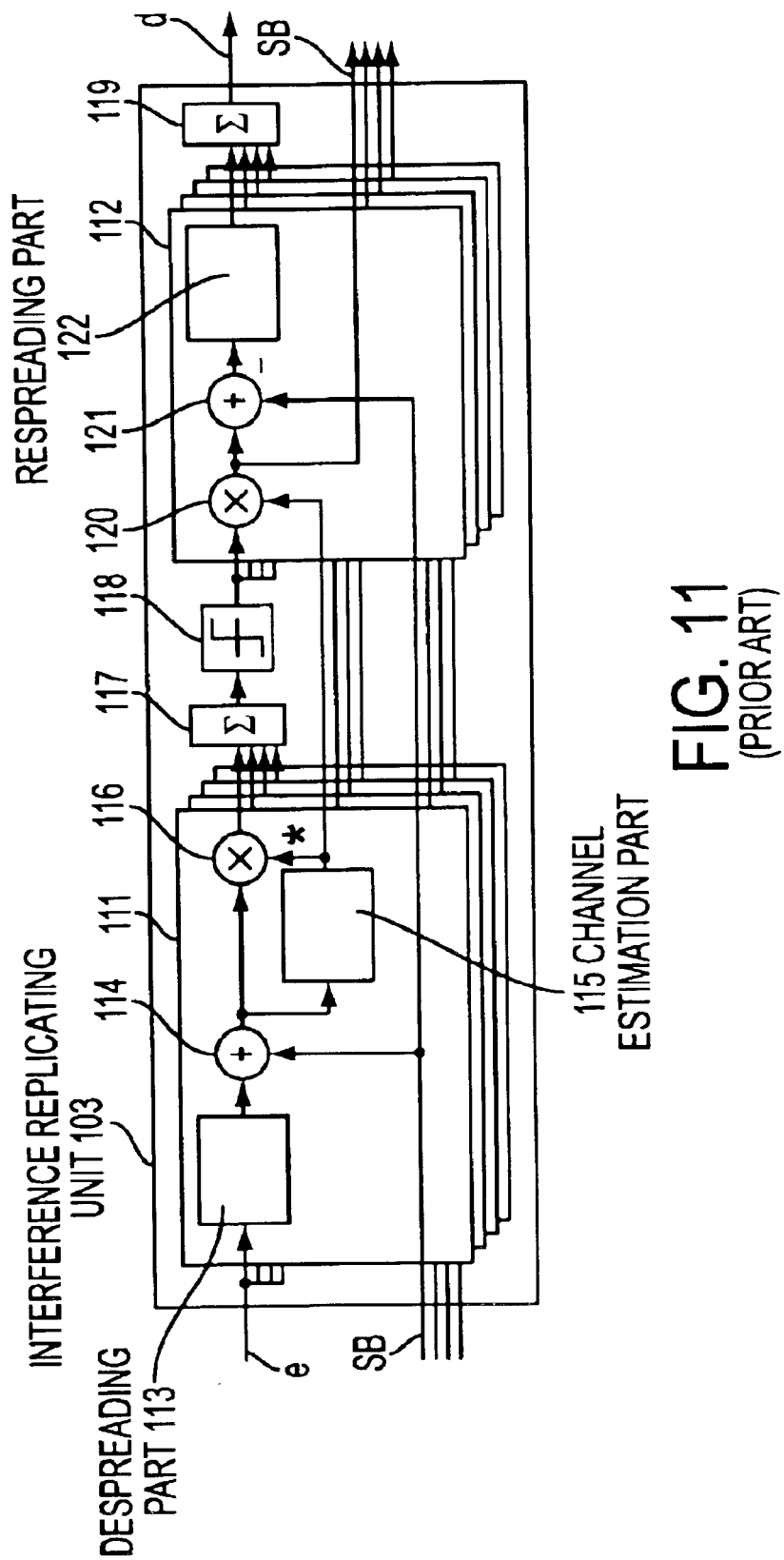
FIG. 11 is a block diagram of a conventional interference replicating unit.

The adaptive array receivers 86-1–86-k for the low-rate users perform the demodulation process on the basis of the combined signal obtained by the beam forming using the interference-eliminated signals. The adaptive array receivers 87-1–87-L for the high-rate users perform the demodulation process on the basis of the interference-eliminated signals from the adders 85-1–85-m and the symbol replicas from the array antenna interference replicating units 84-1–84-L. The adaptive array receivers 87-1–87-L for the hi rate users have a structure that is, for example, a combination of the despread processing parts 14 shown in FIG. 3, the despread processing parts 11I shown in FIG. 11 and the despread processing parts 133 shown in FIG. 12.

Figure 9:
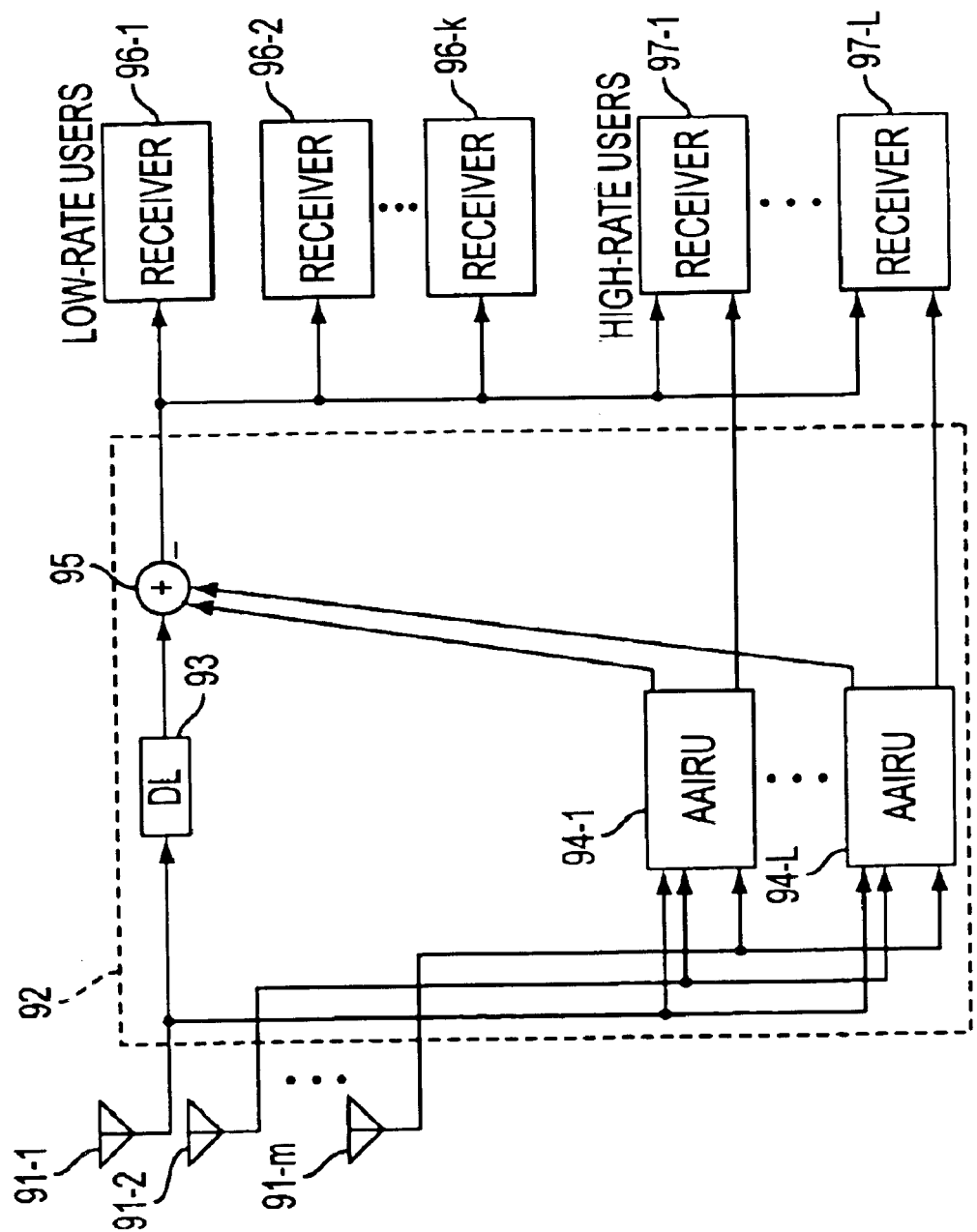
FIG. 9 is a block diagram of a radio communication device according to a fourth embodiment of the present invention.
Figure 10:
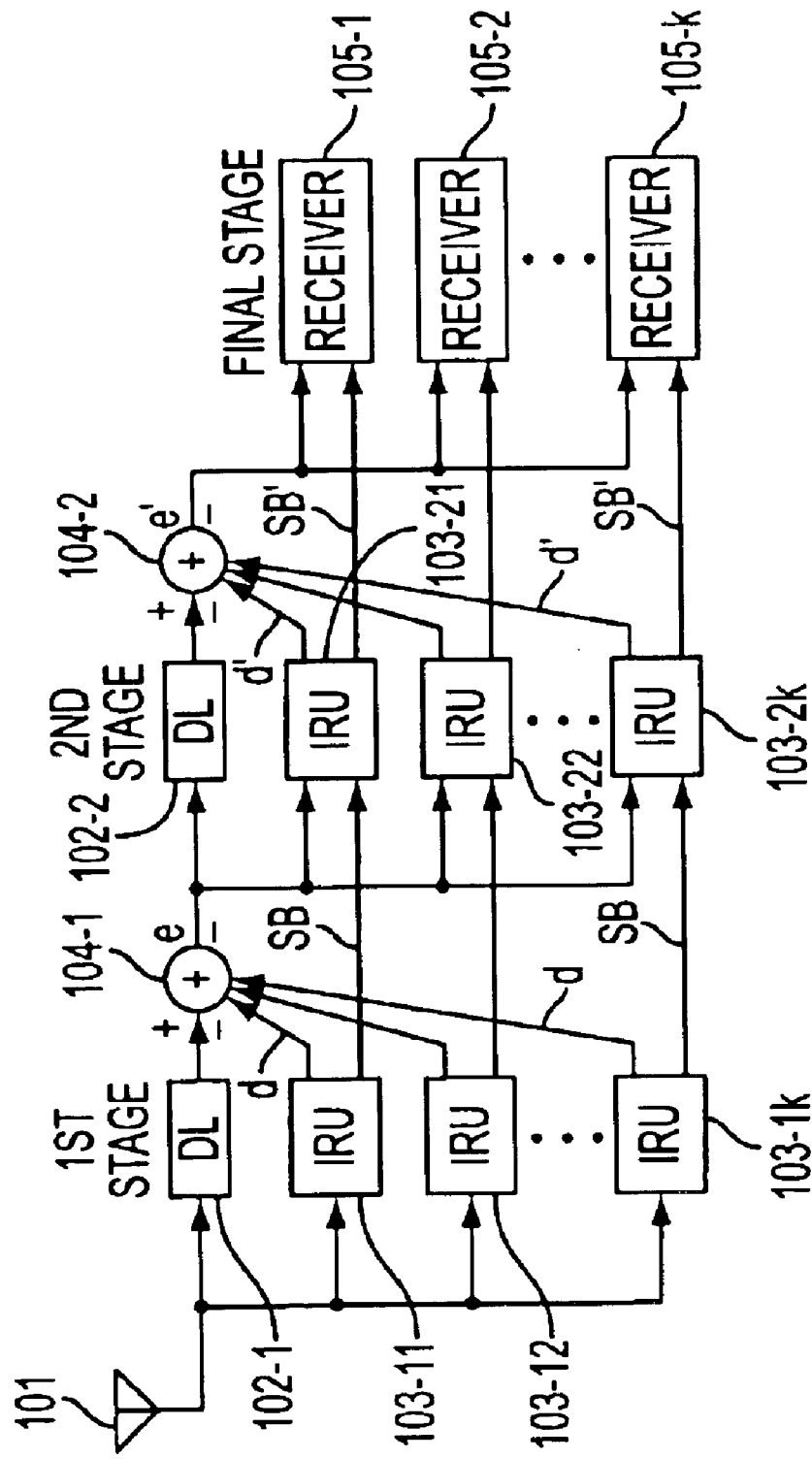
FIG. 10 is a block diagram of a conventional interference canceller.

FIG. 9 shows a radio communication device according to a fourth embodiment of the present invention. In this figure, reference numbers 91-1–91-m indicate array antenna elements, 92 indicates an interference canceller, 93 indicates a delay circuit (DL), 94-1–94-L indicate array antenna interference replicating units (AAIRU), 95 indicates an adder, 96-1–96-k indicate receivers for the low-rate users, and 97-1–97-L indicate receivers for the high-rate users. The array antenna interference replicating units 94-1–94-L have the same structure as that of the array antenna interference creating units in the aforementioned embodiments of the present invention.

As in the case of the structure shown in FIG. 7, a signal received via one of the array antenna elements 91-1–91-m, namely, array antenna elements 91-1 in FIG. 8 is delayed by the delay circuit 83-1 and is then applied to the adder 85-1. Interference replicas and symbol replicas are created by the array antenna interference replicating units 94-1–94-L, which receive the signals received via the array antenna elements 91-1–91-m. The interference replicas are applied to the adder 95, which subtracts the received interference replicas from the received signal applied via the delay circuit 93. Hence, an interference-eliminated signal is obtained.

The interference-eliminated signal obtained is applied to the receivers 96-1–96-k for the low-rate users and the receivers 97-1–97-L for the high-rate users. The low-rate user receiving 96-1–96-k perform the demodulation process using the symbol replicas from the array antenna interference replicating units 94-1–94L and the interference-eliminated signal from the adder 95.

The present invention is not limited to the aforementioned embodiments, but various variations and modifications may be made. For example, the searcher shown in FIG. 4 in which the path detection for the high-rate channels can be performed using the threshold value TH1 for the path detection for the low-rate channels may be applied to other embodiments of the present invention.

As described above, the present invention is directed to an interference canceller for the DS-CDMA communication system, which performs multi-rate transmission including low-rate channels and high-rate channels, and a radio communication device using the same. Radio waves are received through the array antennas, and the array antenna interference replicating unit is provided, which creates interference replicas for the high-rate channels. Thereby, the interference of the high-rate channels to the received signals can be eliminated.

Further, without the interference replicating unit for the low-rate channels, the interference of the high-rate channels is eliminated and the transmission qualities of the low-rate channels are improved. Thus, the present invention is less expensive than the case where the array antenna interference replicating units are respectively provided to all the channels of the multi-rate transmission. Although, the structure of the invention is simple, the invention eliminates interference of the high-rate channels having high power.

What is claimed is:

1. An interference canceller device for a DS-CDMA communication system including low-rate channels and high-rate channels, comprising:

an interference replicating unit being associated with the high-rate channels for creating interference replicas of the high-rate channels from received signals; and an adder for subtracting only the interference replicas of the high-rate channels from the received signals.

2. The device of claim 1, which further includes a delay circuit for delaying the received signals to the adder.

3. The device of claim 1, wherein the interference replicating unit includes a despread processing part.

4. The device of claim 3, which further includes a searcher for detecting different paths based on a delay profile of the received signals and allocating the despread processing part of the interference replicating unit to the paths detected.

5. The device of claim 4, wherein the searcher includes a memory for storing a threshold value for detecting paths of the low-rate channels, a path detection unit for detecting paths of the high-rate channels based on the threshold value stored and then allocating the despread processing parts of the interference replicating unit to the paths detected.

6. A radio communication device for a DS-CDMA communication system including low-rate channels and high-rate channels, comprising:

an interference canceller including an interference replicating unit being associated with the high-rate channels for creating interference replicas of the high-rate channels from received signals and an adder for subtracting only the interference replicas of the high-rate channels from the received signals producing interference-eliminated signals; and a receiver for the low-rate channels for performing demodulation on the interference-eliminated signals.

7. The device of claim 6, which further includes a delay circuit for delaying the received signals to the adder.

8. The device of claim 6, wherein the interference replicating unit includes a despread processing part.

9. The device of claim 8, which further includes a searcher for detecting different paths based on a delay profile of the received signals and allocating the despread processing part of the interference replicating unit to the paths detected.

10. The device of claim 9, wherein the searcher includes a memory for storing a threshold value for detecting paths of the low-rate channels, a path detection unit for detecting paths of the high-rate channels based on the threshold value stored and then allocating the despread processing parts of the interference replicating unit to the paths detected.

11. An interference cancelling method for a DS-CDMA communication system including low-rate channels and high-rate channels, the method comprising the steps of:

creating interference replicas from received signals for the high-rate channels; and subtracting only the interference replicas of the high-rate channels from the received signals for the high rate channels producing interference-eliminated signals.

12. The method of claim 11, which further includes delaying the received signals before subtracting the interference replicas.

13. The method of claim 11, which further includes demodulating the interference-eliminated signals.

14. An interference replicating unit for a DS-CDMA communication system including low-rate channels and high-rate channels and including a multi-array antenna, comprising:

a plurality of despreading parts for despreading signals received from the multi-array antenna producing despread signals;

a decision part coupled to the despreading parts for providing decision output signals; and a plurality of respreading parts, coupled to the decision part for respreading the decision output signals, wherein the interference replicating unit is associated with the high-rate channels for creating only interference replicas of the high-rate channels from received signals.

15. A path searcher for a DS-CDMA communication system including low-rate channels and high-rate channels, comprising:

a memory for storing a delay profile for the low-rate channels and a delay profile for the high-rate channels;

path detection part for setting a first threshold and selecting paths in the delay profile for the low-rate channels exceeding the first threshold;

a second memory for storing the first threshold; and the path selection part for selecting paths in the delay profile for the high-rate channels exceeding the first threshold.

16. The searcher of claim 15, wherein the path selection part further sets a second threshold and selects paths in the delay profile for the high-rate channels exceeding the second threshold.

17. A path searching method for a DS-CDMA communication system including low-rate channels and high-rate channels, the method comprising the steps of:

storing a delay profile for the low-rate channels and a delay profile for the high-rate channels;

setting a first threshold and selecting paths in the delay profile for the low-rate channels exceeding the first threshold;

storing the first threshold; and selecting paths in the delay profile for the high-rate channels exceeding the first threshold.

18. The method of claim 17, which further includes setting a second threshold and selecting paths in the delay profile for the high-rate channels exceeding the second threshold.

* * * * *